（12） United States Patent
Fan et al.

(10) Patent No.: US 9,655,010 B2
(45) Date of Patent: May 16, 2017

(54) METHOD AND APPARATUS FOR MOBILITY MANAGEMENT

(71) Applicant: Telefonaktiebolaget L M Ericsson (publ), Stockholm (SE)

(72) Inventors: Rui Fan, Beijing (CN); Gunnar Mildh, Sollentuna (SE); Qianxi Lu, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/417,115

(22) PCT Filed: Dec. 17, 2014

(86) PCT No.: PCT/CN2014/094133
§ 371 (c)(1),
(2) Date: Jan. 23, 2015

(65) Prior Publication Data
US 2016/0183133 A1    Jun. 23, 2016

(51) Int. Cl.
*H04W 36/00* (2009.01)
*H04W 24/10* (2009.01)
*H04W 92/20* (2009.01)

(52) U.S. Cl.
CPC ....... *H04W 36/0033* (2013.01); *H04W 24/10* (2013.01); *H04W 36/0055* (2013.01); *H04W 36/0061* (2013.01); *H04W 92/20* (2013.01)

(58) Field of Classification Search
None
See application file for complete search history.

(56) References Cited

U.S. PATENT DOCUMENTS

2008/0254800 A1   10/2008   Chun et al.
2009/0180445 A1   7/2009    Ue
2011/0216645 A1   9/2011    Song et al.
(Continued)

FOREIGN PATENT DOCUMENTS

CN    1852557 A      10/2006
CN    101237677 A    8/2008
CN    101904201 A    12/2010

OTHER PUBLICATIONS

International Search Report and the Written Opinion for Application No. PCT/CN2014/094133, mailed Sep. 29, 2015, 11 pages.
(Continued)

*Primary Examiner* — Diane Mizrahi
(74) *Attorney, Agent, or Firm* — Nicholson De Vos Webster & Elliott LLP

(57) ABSTRACT

Embodiments of the present disclosure provide a method for mobility management at a network management center. The method comprises indicating a target access node to a terminal device being served by a source access node, in response to determining that the terminal device needs to be handed over to the target access node. The method also comprises transmitting network-related context information of the terminal device to the target access node that receives terminal-related context information of the terminal device from the terminal device. By virtue of this method, the access node may be made with a simple and low cost structure; deployment of access nodes may be more flexible and handover of the terminal device may be more efficient.

11 Claims, 9 Drawing Sheets

(56) References Cited

U.S. PATENT DOCUMENTS

2013/0102310 A1* 4/2013 Carbo Malonda .... H04L 63/107
                                                         455/435.1
2015/0003280 A1   1/2015 Colban et al.

OTHER PUBLICATIONS

Non-Final Office Action for U.S. Appl. No. 15/099,976, mailed Dec. 29, 2016, 18 pages.

* cited by examiner (a)

(b)

METHOD AND APPARATUS FOR MOBILITY MANAGEMENT

CROSS-REFERENCE TO RELATED APPLICATIONS

This application is a National stage of International Application No. PCT/CN2014/094133, filed Dec. 17, 2014, which is hereby incorporated by reference.

TECHNICAL FIELD

The non-limiting and exemplary embodiments of the present disclosure generally relate to the technical field of wireless communications, and specifically to a method and apparatus for mobility management, particularly in millimeter-wave, mmW, networks.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband continues to drive a demand for a higher overall traffic capacity and a higher achievable end-user data rate in a radio access network. Several application scenarios in the future will require data rates up to 10 Gbps in local areas. The demand for such a high system capacity and end-user date rates may be met by networks in which a distance between access nodes, ANs, ranges from a few meters in indoor deployments up to roughly 50 m in outdoor deployments, i.e. with an infra-structure density considerably higher than the densest networks of today. The broad transmission bandwidth required for providing a data rate up to 10 Gbps and above may promisingly be obtained from mmW bands.

In a traditional 3GPP LTE ($3^{rd}$ generation partnership project long term evolution) system, when a user equipment UE within coverage of an eNB, which may be referred to as a source eNB, moves to coverage of another eNB, which may be referred to as a target eNB, a handover procedure needs to be executed. During the handover procedure, the UE's context information and packets that the UE needs to transmit/receive will be forwarded from the source eNB to the target eNB to guarantee a lossless and seamless handover.

FIG. 1 schematically illustrates the handover procedure in the 3GPP LTE system. Firstly, a UE sends a measurement report to a source eNB (S_eNB). Then the S_eNB will prepare for handover to a target eNB (T_eNB) by transferring to the T_eNB information required for the handover. The required information may comprise the UE's context information including UE-AMBR (Aggregate Maximum Bit Rate), UE Security Capability, KeNB*, E-RAB (E-UTRAN Radio Access Bearer) to be setup, RRC (Radio Resource Control) Context, UE History information etc. and may also comprise SN (Sequence Number) Status Transfer and packets to be transferred in downlink (DL) or uplink (UL) etc. Upon reception of the information required for the handover from S_eNB to T_eNB, the T_eNB may proceed to complete the handover procedure as illustrated in FIG. 1. Apparently, this handover procedure puts a very heavy burden on the source eNB, since all information required for handover needs to be maintained at the source eNB and forwarded to the target eNB from the source eNB. Accordingly, the complexity of eNBs and the cost for deploying eNBs in the LTE system are relatively high. Considering the much higher density of AN deployment in mmW networks, application of the existing handover procedure of the LTE system to the mmW networks unavoidably pushes the cost and system complexity further higher.

Therefore, there is a need for a solution specifically designed for mobility management in mmW networks that is adapted to inherent characteristics of the mmW networks.

SUMMARY

Various embodiments of the present disclosure mainly aim at providing a method and apparatus for mobility management to facilitate the handover procedure in mmW networks. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method for mobility management at a network management center. The method comprises indicating a target access node to a terminal device being served by a source access node, in response to determining that the terminal device needs to be handed over to the target access node. The method also comprises transmitting network-related context information of the terminal device to the target access node that receives terminal-related context information of the terminal device from the terminal device.

In one embodiment, before indicating the target access node, the method may further comprise receiving a measurement report from the terminal device via the source access node; and determining whether the terminal device needs to be handed over to the target access node based on the measurement report. The source access node and the target access node may be communicatively connected to the network management center via their wireless connections with at least one aggregation node that is connected to the network management center via a wired connection.

In another embodiment, the network management center may comprise a network controller and a local gateway, to both of which the at least one aggregation node is connected. The aforesaid indicating the target access node, transmitting network-related context information, receiving a measurement report and determining whether the terminal device needs to be handed over to the target access may be carried out at the network controller, while data traffic between the terminal device and the network management center is communicated through the local gateway.

In yet another embodiment, the method may comprise verifying an identity of the terminal device and integrity of the terminal-related context information based on both verification information provided by the terminal device and security information provided by the network management center. The method may also comprise informing a result of the verification to the target access node.

In yet another embodiment, the network-related context information of the terminal device may at least comprise information regarding quality of service.

In yet another embodiment, the terminal-related context information of the terminal device may at least comprise information related to capabilities of the terminal device and a data transfer status.

In a second aspect of the present disclosure, there is provided a method for handover at a terminal device. The method comprises receiving, from a network management center, an indication of a target access node for handover from a source access node currently serving the terminal device. The method also comprises transmitting terminal-related context information of the terminal device to the target access node that receives network-related context information of the terminal device from the network management center.

In one embodiment, before receiving the indication from the network management center, the method may further comprise reporting measurements to the network management center via the source access node. The source access node and the target access node are connected to the network management center via their wireless connections with at least one aggregation node that is connected to the network management center via a wired connection.

In another embodiment, the network management center may comprise a network controller and a local gateway, to both of which the at least one aggregation node is connected. The measurements may be reported to the network controller and the information is received from the network controller, while data traffic may be communicated between the terminal device and the network management center through the local gateway.

In a third aspect of the present disclosure, there is provided a method at an access node for handover of a terminal device. The method comprises receiving terminal-related context information of the terminal device from the terminal device being served by a source access node and receiving network-related context information of the terminal device from a network management center. The method also comprises establishing communications with the terminal device based at least on the terminal-related context information and the network-related context information.

In one embodiment, the method may further comprise verifying an identity of the terminal device and integrity of the terminal-related context information based on both verification information provided by the terminal device and second security information provided by the network management center.

In a fourth aspect of the present disclosure, there is provided an apparatus for mobility management at a network management center. The apparatus comprises an indicating module configured to indicate a target access node to a terminal device being served by a source access node, in response to being determined that the terminal device needs to be handed over to the target access node. The apparatus also comprises a transmitting module configured to transmit network-related context information of the terminal device to the target access node that receives terminal-related context information of the terminal device from the terminal device.

In a fifth aspect of the present disclosure, there is provided an apparatus for handover at a terminal device. The apparatus comprises a receiving module configured to receive, from a network management center, an indication of a target access node for handover from a source access node currently serving the terminal device. The apparatus also comprises a transmitting module configured to transmit terminal-related context information of the terminal device to the target access node that receives network-related context information of the terminal device from the network management center.

In a sixth aspect of the present disclosure, there is provided an apparatus at an access node for handover of a terminal device. The apparatus comprises a receiving module configured to receive terminal-related context information of the terminal device from the terminal device and to receive network-related context information of the terminal device from a network management center. The apparatus also comprises a communication establishing module configured to establish communications with the terminal device based at least on the terminal-related context information and the network-related context information.

In a seventh aspect of the present disclosure, there is provided an apparatus for mobility management at a network management center. The apparatus comprises a processor and a memory. The memory containing instructions executable by the processor whereby the apparatus is operative to perform the method according to the first aspect of the present disclosure.

In an eighth aspect of the present disclosure, there is provided an apparatus for handover at a terminal device. The apparatus comprises a processor and a memory. The memory containing instructions executable by the processor whereby the apparatus is operative to perform the method according to the second aspect of the present disclosure.

In a ninth aspect of the present disclosure, there is provided an apparatus for handover at a terminal device. The apparatus comprises a processor and a memory. The memory containing instructions executable by the processor whereby the apparatus is operative to perform the method according to the third aspect of the present disclosure.

According to the various aspects and embodiments as mentioned above, the context information required for handover of a terminal device or UE from a source access node to a target access node in a radio network, such as mmW network, can be obtained by the target access node from the terminal device itself and the network management center respectively. Therefore, the burden for the source access node to maintain and transmit the context information is alleviated. Accordingly, the cost and complexity of each access node in the mmW network may be reduced. Also, in the proposed mobility management method, the context information more related to the terminal device, i.e. terminal-related context information can be obtained directly from the terminal device while the context information more related to the network, i.e. network-related context information can be obtained directly from the network management center without passing through the source access node. Therefore, the duration for handover of the terminal device from the source access node to the target access node may be shortened and thus the handover speed may be increased. Moreover, in some embodiments, each of the access nodes is communicatively connected to the network management center via a wireless connection with an aggregation node that is connected to the network management center through a wired connection. Thus, the deployment of the access nodes may be more flexible.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
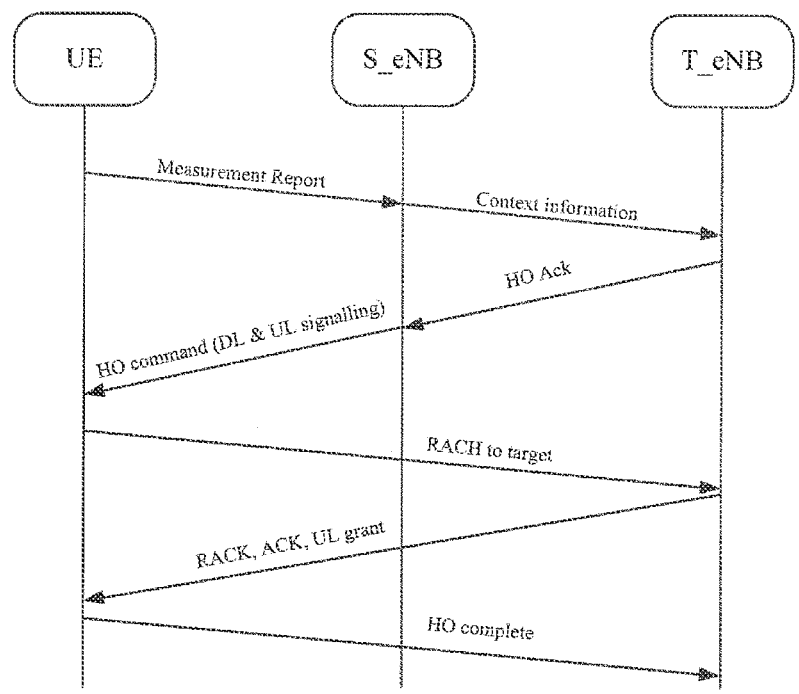
FIG. 1 schematically illustrates a handover procedure in a 3GPP LTE system.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal or UE having wireless communication capabilities, including but not limited to, mobile phones, cellular phones, smart phones, or personal digital assistants (PDAs), portable computers, image capture devices such as digital cameras, gaming devices, music storage and playback appliances and the like. In the following description, the terms "user equipment" or "UE" and "terminal device" may be used interchangeably.

For illustrative purposes, several embodiments of the present disclosure will be described in the context of mmW networks. Those skilled in the art will appreciate, however, that the concept and principle of the several embodiments of the present disclosure may be more generally applicable to other wireless networks.

The Background section has briefly introduced that the handover procedure defined in the 3GPP LTE systems is not suitable for mmW networks. More particularly, during the existing handover procedure, a source eNB needs to calculate a security key for a target eNB, and the source eNB also needs to record UE's context information and then forward it to the target eNB. In order to implement all these functions, the burden on the eNB is unavoidably heavy and thus the eNB couldn't possibly be made with a simple structure or with a low cost. Moreover, the deployment of eNBs in an LTE network is relatively fixed, which needs a location plan for all eNBs beforehand and then sets up a neighborhood relationship among these eNBs. However, due to a high density of AN deployment in mmW networks, it becomes more complicated to set up a neighborhood relationship among multiple ANs, which however is a prerequisite for the existing handover procedure. Also, with the beforehand neighborhood relationship being set up, the deployment of ANs in mmW networks could not be flexible or dynamic. Furthermore, due to the coverage of each AN in mmW networks is much less than the coverage of each eNB in LTE networks, the UE may be more frequently handed over between ANs within an mmW network compared to an LTE network. For example, the time for switching a UE between ANs in an mmW network could be in the order of 1 second. However, it is difficult to meet such a requirement by using the existing handover procedure.

In view of the above concerns, following embodiments of the present disclosure provide a solution adapted for mobility management in an mmW network, which may address one or more of the aforesaid disadvantages of the existing handover procedure.

Figure 2:
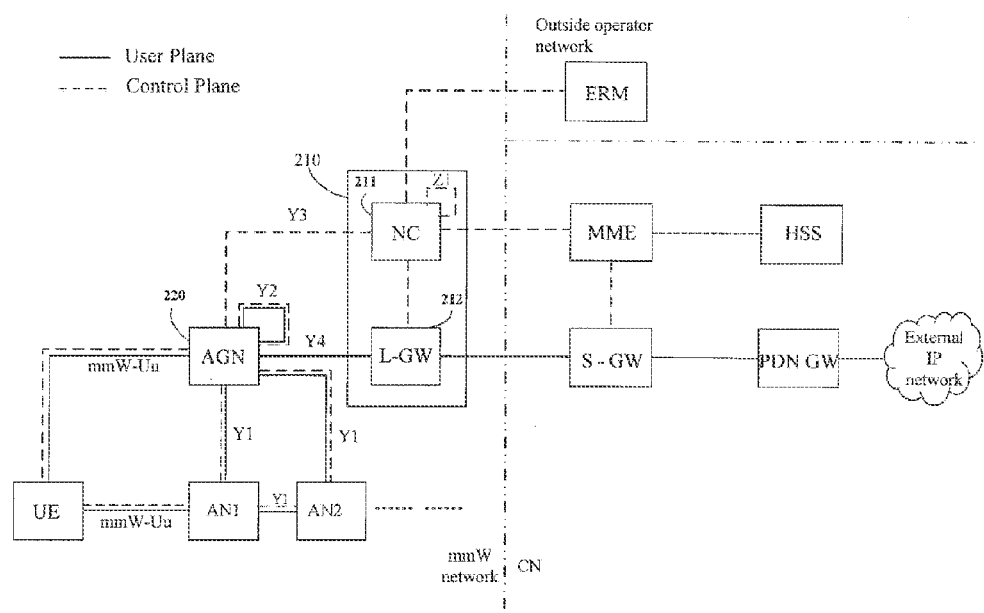
FIG. 2 illustrates a system architecture of an mmW network according to embodiments of the present disclosure.
Figure 3:
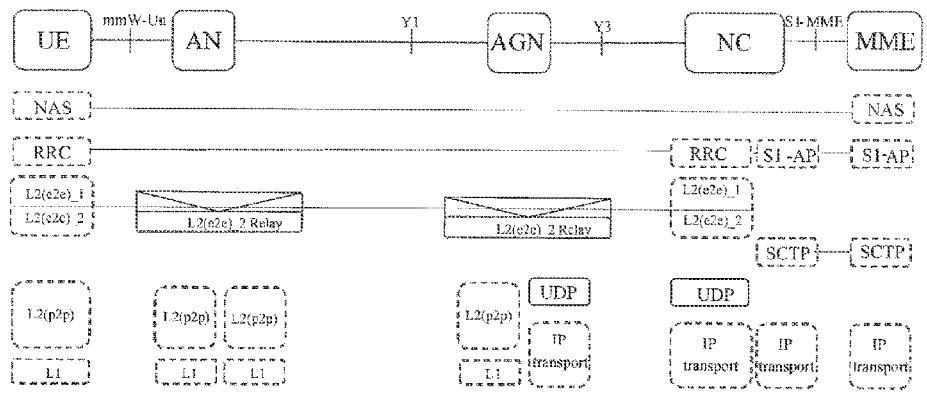
FIG. 3 shows a schematic diagram for illustrating a control plane protocol stack from the UE up to the MME via the NC as shown in FIG. 2.
Figure 3:
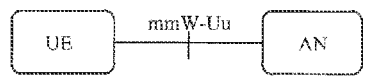
Figure 3:
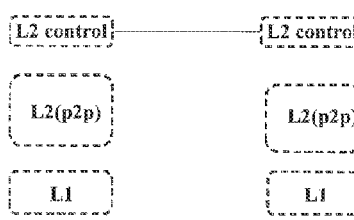

In order to clearly describe the proposed solution according to embodiments of the present disclosure, the system architecture of an mmW network according to embodiments of the present disclosure and the related control plane protocol stack will be briefly introduced in FIGS. 2 and 3 respectively.

As illustrated in FIG. 2, the left part shows an mmW network and the right part shows a few nodes of a core network, CN, such as a mobility management entity (MME) and serving gateway (S-GW), to which the mmW network is connected, and Home Subscriber Server (HSS), Public Data Network Gateway (PDN GW). The nodes of CN as shown in FIG. 2 are only used to illustrate a connection relationship between the mmW network and CN, instead of limiting the scope of the present disclosure in any way.

The illustrated mmW network of FIG. 2 comprises a network management center 210, an aggregation node (AGN) 220, access nodes AN1 and AN2, and a UE. For the purpose of conciseness, FIG. 2 merely illustrates one mmW network connected to the core network that comprises one AGN, two ANs, and one UE. However, it shall be appreciated that more than one mmW network may be concurrently connected to the core network and each mmW network may comprise more than one AGN each connecting to more than two ANs, and a plurality of UEs. The number of each entity or node in the mmW network as shown in FIG. 2 is only illustrative instead of limiting.

The access node or AN used according to embodiments of the present disclosure may refer to a device or entity or a part of a device or entity which may establish wireless communications with UEs so as to provide services to them and is also capable of establishing wireless communications with an AGN. The aggregation node, AGN, used herein may refer to a device or entity or a part of a device or entity which may connect one or more ANs to the network management center via a wired connection. Additionally or alternatively, the aggregation node itself may also function as an AN.

The network management center may comprise a network controller NC 211 which is at the control plane and a local gateway L-GW 212 which is at the user plane. Preferably, the NC and L-GW may be embodied as two physically separate entities. Alternatively, the NC and L-GW may also be embodied in a single entity. In FIG. 2, signaling flows at the control plane are shown with dotted lines and data flows at the user plane are shown with solid lines. The NC is a terminating point of the core network control plane and the L-GW is a terminating point of the core network user plane, so that the UE's mobility within the mmW network is invisible to the core network. The NC may also be responsible for high level radio resource management (RRM) of the mmW network, such as spectrum selection, inter-RAT (Radio Access Technology) mobility between mmW and other mobile systems, e.g. LTE, interference aware routing for resource allocation and routing selection. The NC and L-GW may further be responsible for security protection for UEs, and lossless mobility between different ANs. The NC and L-GW are connected to the AGN via wired connections.

From the perspective of the core network, a combination of the network management center, AGN and ANs of the mmW network functions as a whole like a regular base station, e.g. an eNB in the LTE network, and thereby the mobility of the UE within the mmW network is invisible to the core network.

As illustrated in FIG. 2, the interface over which the AN communicates control signaling and data traffic with the UE is defined as an mmW-Uu interface and the interface over which the AGN communicates control signaling and data traffic with the AN is defined as a Y1 interface. The interface used for communications between ANs may also be defined as the Y1 interface and the interface used for communications between AGNs, if more than one AGN exists in the mmW network, may be defined as an Y2 interface. The interface over which the NC communicates control signaling with the AGN is defined as an Y3 interface, which may be an extended S1-MME interface. The interface used for communications between NCs, if more than one mmW exists, may be defined as a Z1 interface. The term "interface" between two nodes or entities defined herein has the same meaning as commonly understood by one of ordinary skills in the art, which may comprise definitions of a set of protocols and predefined data/signaling formats for communications between the two nodes or entities.

FIG. 3 shows a schematic diagram for illustrating a control plane protocol stack from the UE up to the MME via the NC as shown in FIG. 2. As illustrated in FIG. 3(a), the existing NAS (Non-access stratum) protocol can still be used to attach the UE to the MME in the core network. Within the mmW network, the UE has a direct RRC connection with the NC. The existing RRC protocol is used to configure/control the end-to-end (e2e) measurement and e2e connection between the UE and the NC, e.g. the QoS to be provided for this UE over the mmW network. As shown in FIG. 3(a), this RRC protocol is transferred over an e2e L2 (Layer 2) protocol which provides reliable transmission services. Due to the multi-hop connection from the UE to the NC, a L2 e2e relay exists in the AN and the AGN to help forward packets between the UE and the NC. FIG. 3(b) shows a simplified control plane protocol stack between the UE and the AN in the mmW network of FIG. 2. Similarly to FIG. 3(a), an L2 control protocol exists between the UE and the AN, which controls local link performance. Other denotations in FIG. 3 that are not specifically described herein have the same technical meaning in the prior art and thus will not be detailed for the purpose of conciseness.

Hereafter, the solution for mobility management according to embodiments of the present disclosure will be described in details with reference to FIGS. 4-10.

Figure 4:
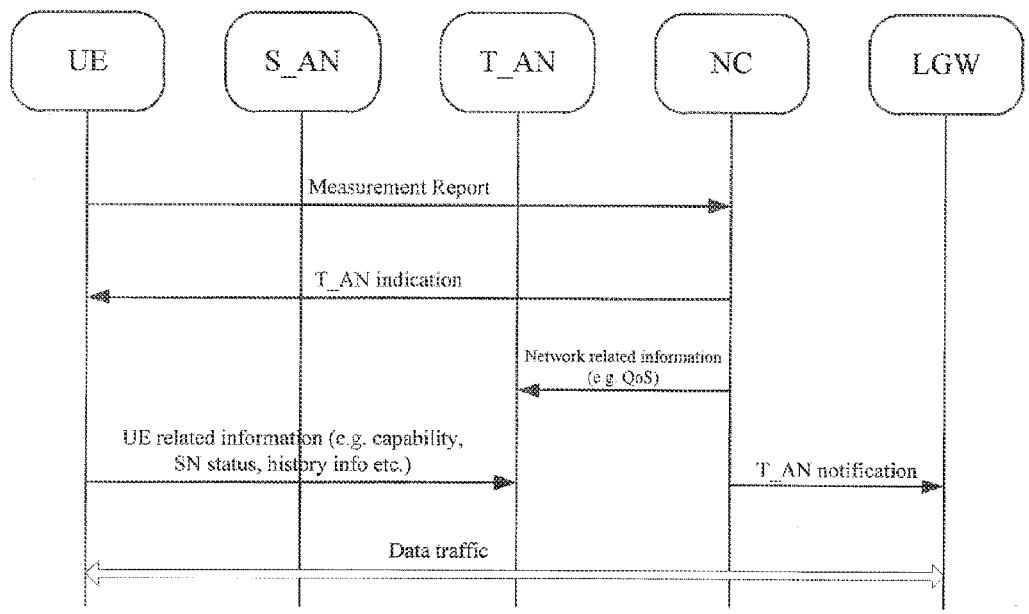
FIG. 4 shows an interaction diagram for illustrating a mobility management method in an mmW network according to embodiments of the present disclosure.

FIG. 4 shows an interaction diagram for illustrating a mobility management method used in an mmW network, for example the mmW network of FIG. 2, according to embodiments of the present disclosure.

Firstly, a UE may report measurements, e.g. RSRP (Reference Signal Receiving Power), RSRQ (Reference Signal Receiving Quality), RSSI (Received Signal Strength Indication), to a network management center, particularly to a network controller, NC. Then the NC which has a knowledge of the overall mmW network topology, may determine, based on the reported measurements, whether the UE being served by a source AN (S_AN), e.g. AN1 as illustrated in FIG. 2, needs to be handed over to a target AN (T_AN), e.g. AN2 of FIG. 2. The approach for handover determination based on the reported measurements is similar to that as used in the existing radio networks, such as the LTE network, which thus will not be detailed herein for the conciseness purpose. However, a person skilled in the art shall appreciate that as the technology advances, other approaches for handover determination may also be possible and thereby the scope of the present disclosure is not limited to any specific approach for the handover determination.

Once the network management center, particularly the NC, determines that the UE needs to be handed over to the target AN, the NC will indicate the target AN to the UE that may take over serving it, so that the UE may send terminal-related context information directly to the target AN. Also, the network management center will send network-related context information to the target AN. The terminal-related context information may at least comprise information regarding the UE's capacity, for example the UE's security capacity, maximum buffering capacity, transmission modes that the UE supports etc., and a data transfer status, for example a sequence number of a packet received by the UE. The terminal-related context information may additionally comprise the UE's history information. The network-related information may at least comprise information regarding quality of service (QoS), e.g. QoS control information and how much throughput is allowed for the UE so as to control resources for allocation to the UE.

Preferably and additionally, in order to avoid any malicious UE pretending as the right UE to send malicious context information to the target AN, a security mechanism may be needed to verify an identity of the UE and integrity of the context information provided by the UE.

In one embodiment, the UE when sending a message including the terminal-related context information to the target AN may include verification information that may be calculated based on the terminal-related context information and identification information of the UE in the message for verifying the identity of the UE and integrity of the context information so as to prevent replay attacks. For example, the verification information may be a signature or a cryptographic checksum of the message. The NC may send security information, such as a public key of the UE or an integrity session key, in addition to a sequence number (which always increments) used for calculation of the signature to the target AN. The methods for calculating a signature or checksum of a message is well known by a person skilled in the art, which thus will not be detailed herein for the conciseness purpose.

Then, upon reception of the security information from the NC, the target AN may calculate a value based at least on the security information and then compare the calculated value with the verification information provided by the UE, e.g. the signature, to determine whether the calculated value matches the verification information. If they match, then the identity of the UE and the integrity of the context information received from the UE are verified; otherwise, the verification fails.

In another embodiment, the target AN may forward the verification information received from the UE to the NC. Then the NC may calculate a value based at least on the security information locally provided for the UE and then compare the calculated value with the verification information forwarded from the target AN so as to determine whether they match. If they do, then the identity of the UE and the integrity of the context information provided by the UE are verified; otherwise the verification fails. Then the NC will inform the verification result to the target AN.

Once the identity of the UE and the integrity of the context information provided by the UE are verified, the target AN may establish communications with the UE based at least on the terminal-related context information and the network-related context information.

Additionally, the NC may also notify the L-GW that the UE will be served by the target AN. Then, after the handover from the S_AN to the T_AN is completed, if data retransmission is needed, the data retransmission will be conducted with the L-GW via the target AN. Afterwards, subsequent data traffic will be transferred between the UE and the L-GW via the target AN.

With this mobility management method, the context information required for handover of a UE from a source AN to a target AN can be obtained by the target AN from the UE itself and the NC respectively. Therefore, the burden for the source AN to maintain and transmit the context information is alleviated. Accordingly, the cost and complexity of each AN may be reduced. Also, in the proposed mobility management method, the context information more related to the UE can be obtained directly from the UE and the context information more related to the network can be obtained directly from the NC without passing through the source AN. Therefore, the duration for handover of the UE from the source AN to the target AN may be shortened and thus the handover speed may be increased. Moreover, in the proposed mmW network, each of the ANs is communicatively connected to the NC via a wireless connection with an AGN that is connected to the NC through a wired connection. Thus, the deployment of the ANs may be flexible, for example a new AN may be easily added at any time to the AGN without pre-setting up and maintaining a complicated neighborhood relationship between ANs.

Figure 5:
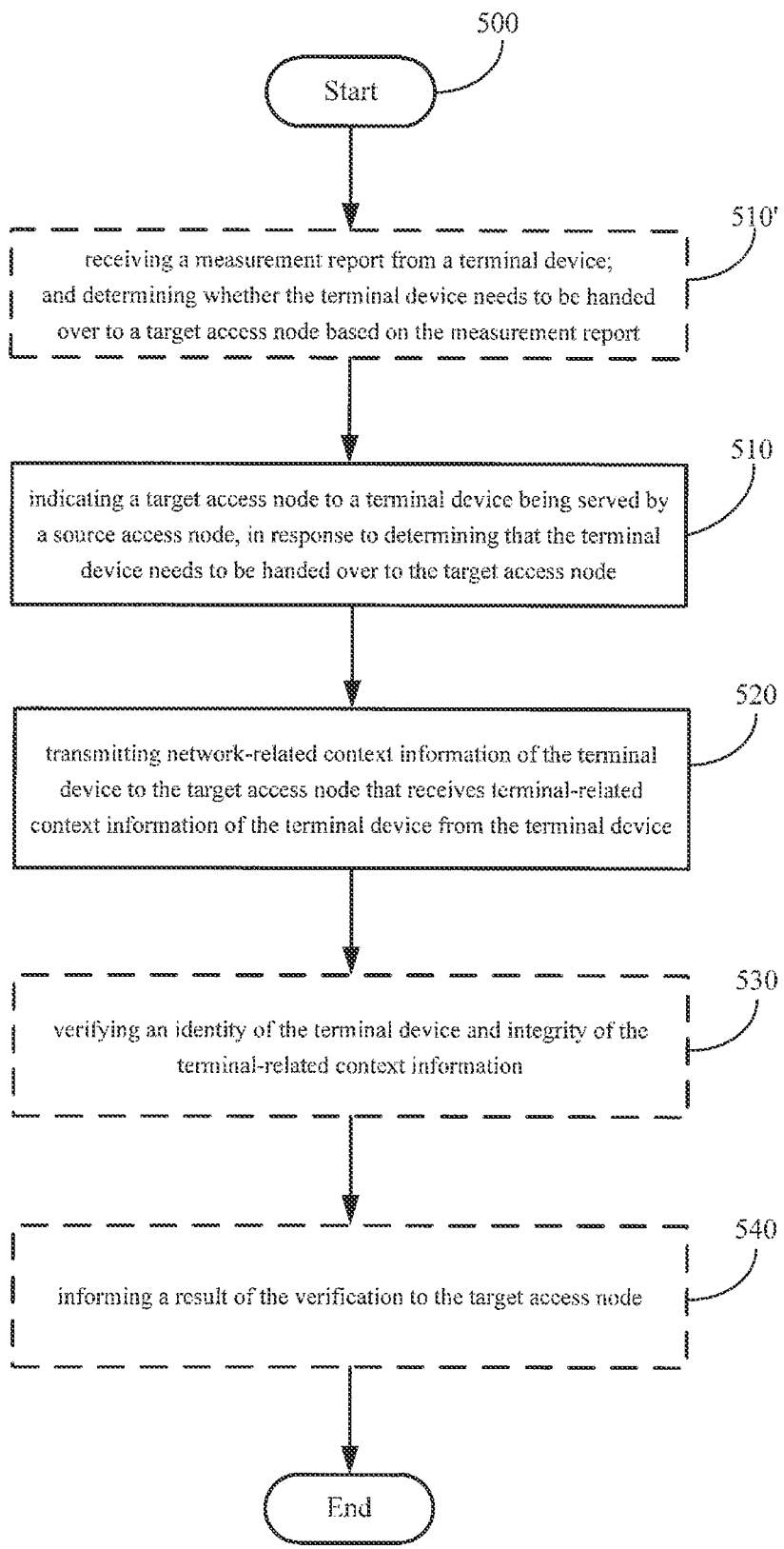
FIG. 5 illustrates a flowchart of a method 500 for mobility management at a network management center according to an embodiment of the present disclosure.

FIG. 5 illustrates a flowchart of a method 500 for mobility management at a network management center according to an embodiment of the present disclosure. As illustrated, the method 500 comprises, in block 510, indicating a target access node to a terminal device being served by a source access node, in response to determining that the terminal device needs to be handed over to the target access node. Also, in block 520, the method 500 comprises transmitting network-related context information of the terminal device to the target access node that receives terminal-related context information of the terminal device from the terminal device.

As described above, the terminal-related context information of the terminal device may at least comprise information regarding the terminal device's capacity, for example the terminal device's security capacity, maximum buffering capacity, transmission modes that the terminal device supports etc., and a data transfer status, for example a sequence number of the packet received by the terminal device. The terminal-related context information may additionally comprise the terminal device's history information. The network-related information may at least comprise information regarding QoS, e.g. QoS control information and how much throughput is allowed for the UE so as to control resources for allocation to the UE.

In one embodiment, before indicating the target access node and transmitting the network-related context information, the method 500 may further comprise receiving 510' a measurement report from the terminal device via the source access node and then determining 510' whether the terminal device needs to be handed over to the target access node based on the measurement report. Additionally, the source access node and the target access node may be communicatively connected to the network management center via their wireless connections with at least one aggregation node that is connected to the network management center via a wired connection.

In another embodiment, the network management center may comprise a network controller and a local gateway, to both of which the at least one aggregation node is connected. As described above with reference to FIGS. 2 and 3, tasks at the control plane may be carried out through the network controller, while tasks at the user plane may be carried out through the local gateway. Accordingly, the aforesaid operations such as indicating the target access node, transmitting the network-related context information, receiving the measurement report and determining whether the terminal device needs to be handed over may be performed by the network controller, while data traffic between the terminal device and the network management center may be communicated through the local gateway via one of the at least one aggregation node.

In yet another embodiment, an identity of the terminal device and integrity of the terminal-related context information may be verified based on both verification information provided by the terminal device and security information provided by the network management center. For example, the verification information may be a signature or a cryptographic checksum of a message sent from the terminal device to the target access node that may comprise the terminal-related context information and identification of the terminal device and the security information may be a public key of the terminal device or an integrity session key as described above. The verification information may be forwarded from the target access node which receives it from the terminal device. Particular methods for verifying the identity of the terminal device and integrity of the context information provided by the terminal device have been described above with reference to FIG. 4 and thus will not be detailed herein for the purpose of conciseness. Then, a result of the verification may be informed to the target access node.

Figure 6:
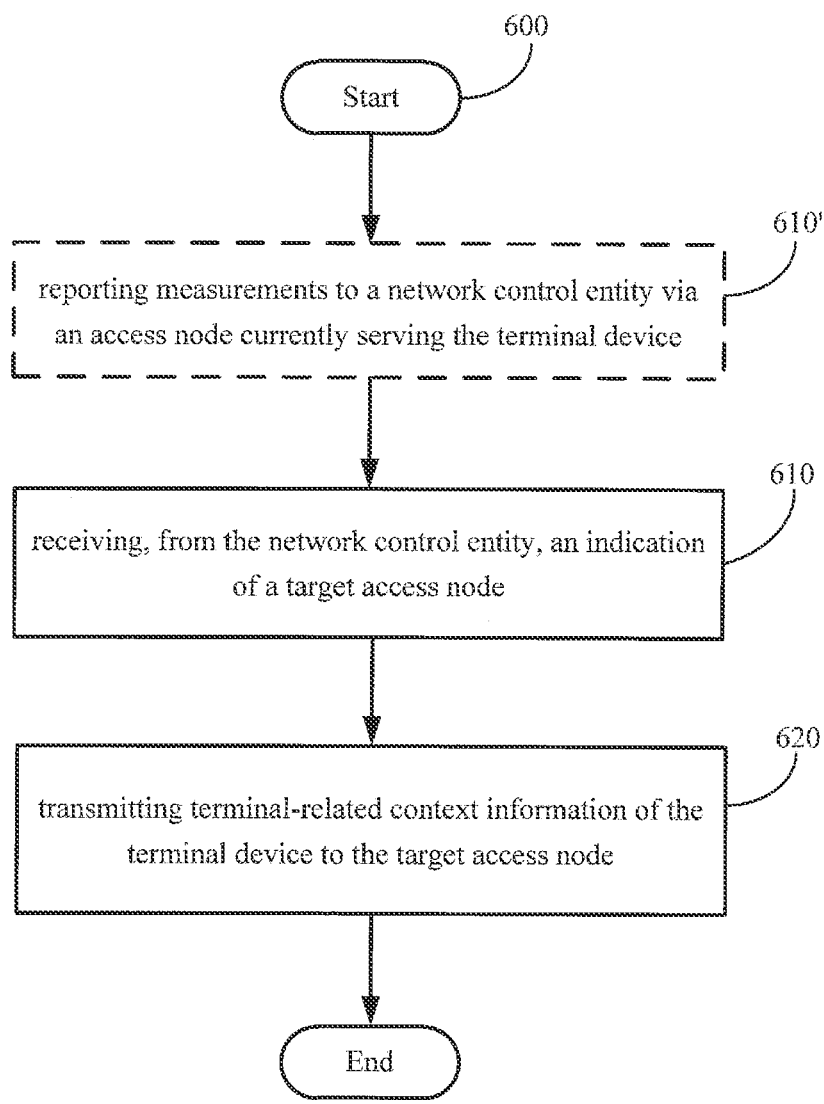
FIG. 6 illustrates a flowchart of a method 600 for handover at a terminal device according to an embodiment of the present disclosure.

FIG. 6 illustrates a flowchart of a method 600 for handover at a terminal device according to an embodiment of the present disclosure. The method 600 comprises receiving, in block 610, from a network management center, an indication of a target access node for handover from a source access node currently serving the terminal device. Then in block 620, the method 600 also comprises transmitting terminal-related context information of the terminal device to the target access node that receives network-related context information of the terminal device from the network management center. As described above, the network-related context information of the terminal device may at least comprise information regarding quality of service. The terminal-related context information of the terminal device may at least comprise information related to capabilities of the terminal device and a data transfer status.

In one embodiment, before receiving the indication from the network management center, the method 600 may further comprise reporting 610' measurements to the network management center via the source access node. Additionally, the source access node and the target access node may be communicatively connected to the network management center via their wireless connections with at least one aggregation node that is connected to the network management center via a wired connection.

In another embodiment, the network management center may comprise a network controller and a local gateway, to both of which the at least one aggregation node is connected. The measurements may be reported to the network controller and the indication may be received from the network controller via one of the at least one aggregation node, while data traffic may be communicated between the terminal device and the network management center through the local gateway via the one of the at least one aggregation node.

Figure 7:
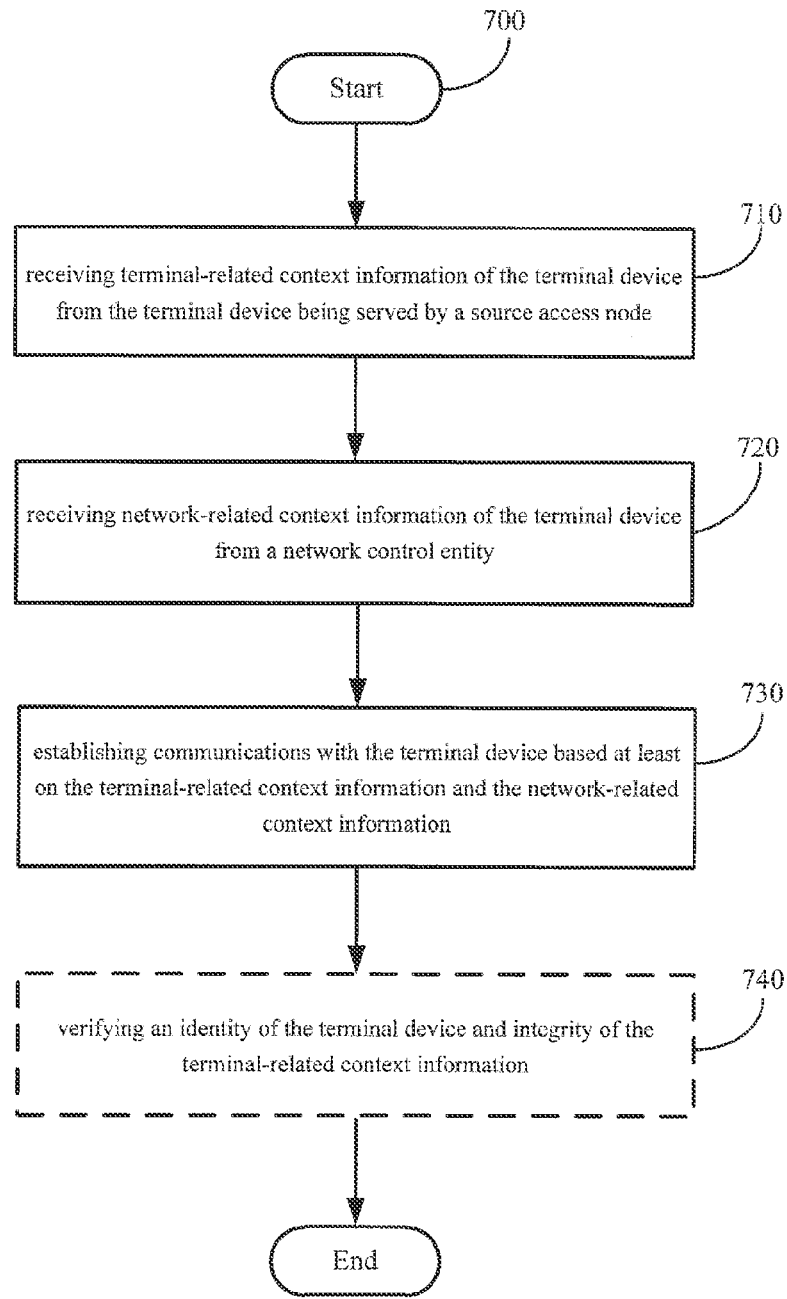
FIG. 7 illustrates a flowchart of a method 700 at a target access node for handover of a terminal device according to an embodiment of the present disclosure.

FIG. 7 illustrates a flowchart of a method 700 at an access node for handover of a terminal device according to an embodiment of the present disclosure. The access node may be a target node to which the terminal device will be handed over. The method 700 comprises receiving, in block 710, terminal-related context information of the terminal device from the terminal device being served by a source access node. Also, the method 700 comprises receiving, in block 720, network-related context information of the terminal device from a network management center and then in block 730 establishing communications with the terminal device based at least on the terminal-related context information and the network-related context information. As described above, the network-related context information of the terminal device may at least comprise information regarding quality of service. The terminal-related context information of the terminal device may at least comprise information related to capabilities of the terminal device and a data transfer status.

In one embodiment, the method 700 may further comprise verifying 740 an identity of the terminal device and integrity of the terminal-related context information based on both verification information provided by the terminal device and security information provided by the network management center. For example, the verification information may be a signature or a cryptographic checksum of a message sent from the terminal device to the target access node that may comprise the terminal-related context information and identification of the terminal device and the security information may be a public key of the terminal device or an integrity session key as described above. Particular methods for verifying the identity of the terminal device and the integrity of the context information provided by the terminal device have been described above with reference to FIG. 4 and thus will not be detailed herein for the purpose of conciseness.

Figure 8:
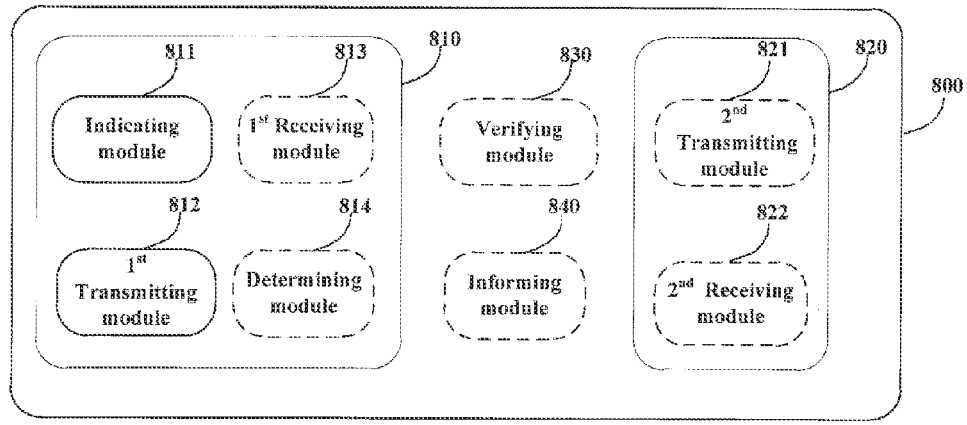
FIG. 8 illustrates a schematic block diagram of an apparatus 800 adapted for mobility management according to an embodiment of the present disclosure.

FIG. 8 illustrates a schematic block diagram of an apparatus 800 adapted for mobility management according to an embodiment of the present disclosure. The apparatus 800 may be embodied as a network management center or comprised in the network management center, for example the network management center 210 as illustrated in FIG. 2.

Particularly, as illustrated in FIG. 8, the apparatus 800 comprises an indicating module 811 configured to indicate a target access node to a terminal device being served by a source access node, in response to being determined that the terminal device needs to be handed over to the target access node. The apparatus 800 also comprises a first transmitting module 812 configured to transmit network-related context information of the terminal device to the target access node that receives terminal-related context information of the terminal device from the terminal device. As described above, the terminal-related context information of the terminal device may at least comprise information regarding the terminal device's capacity, for example the terminal device's security capacity, maximum buffering capacity, transmission modes that the terminal device supports etc., and a data transfer status, for example a sequence number of the packet received by the terminal device. The terminal-related context information may additionally comprise the terminal device's history information. The network-related information may at least comprise information regarding QoS, e.g. QoS control information and how much throughput is allowed for the UE so as to control resources for allocation to the UE.

In one embodiment, the apparatus may further comprise a first receiving module 813 configured to receive a measurement report from the terminal device via the source access node and a determining module 814 configured to determine whether the terminal device needs to be handed over to the target access node based on the measurement report. Additionally, the source access node and the target access node may be connected to the network management center via their wireless connections with at least one aggregation node that is connected to the network management center via a wired connection.

In another embodiment, the network management center may comprise a network controller 810 and a local gateway 820, to both of which the at least one aggregation node is connected. The aforesaid indicating module 811, the first transmitting module 812, the first receiving module 813, and the determining module 814 may be comprised in the network controller 810. Further, the local gateway 820 may comprise a second transmitting module 821 configured to transmit data traffic to the terminal device and a second receiving module 822 configured to receive the data traffic from the terminal device via one of the at least one aggregation node.

In yet another embodiment, the apparatus 800 may further comprise a verifying module 830 configured to verify an identity of the terminal device and integrity of the terminal-related context information based on both verification information provided by the terminal device and security information provided by the network management center. For example, the verification information may be a signature or a cryptographic checksum of a message sent from the terminal device to the target access node that may comprise the terminal-related context information and identification of the terminal device and the security information may be a public key of the terminal device or an integrity session key as described above. The verification information may be forwarded from the target access node which receives it from the terminal device. Particular methods for verifying the identity of the terminal device and integrity of the context information provided by the terminal device have been described above with reference to FIG. 4 and thus will not be detailed herein for the purpose of conciseness. The apparatus 800 may also comprise an informing module 840 configured to inform a result of the verification to the target access node.

The above modules may be configured to implement corresponding operations or steps as described with reference to FIG. 5 and thus will not be detailed herein for the conciseness purpose.

Figure 9:
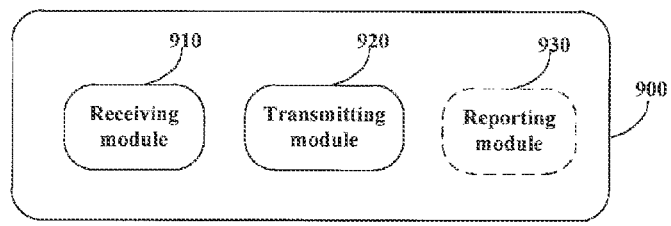
FIG. 9 illustrates a schematic block diagram of an apparatus 900 for handover at a terminal device according to an embodiment of the present disclosure.

FIG. 9 illustrates a schematic block diagram of an apparatus 900 for handover at a terminal device according to an embodiment of the present disclosure. The apparatus 900 comprises a receiving module 910 configured to receive, from a network management center, an indication of a target access node for handover from a source access node currently serving the terminal device. The apparatus 900 further comprise a transmitting module 920 configured to transmit terminal-related context information of the terminal device to the target access node that receives network-related context information of the terminal device from the network management center. As described above, the network-related context information of the terminal device may at least comprise information regarding quality of service. The terminal-related context information of the terminal device may at least comprise information related to capabilities of the terminal device and a data transfer status.

In one embodiment, the apparatus 900 may further comprise a reporting module 930 configured to report measurements to the network management center via the source access node. Additionally, the source access node and the target access node may be connected to the network management center via their wireless connections with at least one aggregation node that is connected to the network management center via a wired connection.

In another embodiment, the network management center may comprise a network controller and a local gateway, to both of which the at least one aggregation node is connected. In particular, the measurements are reported by the reporting module 930 to the network controller and the indication is received by the receiving module 910 from the network controller via one of the at least one aggregation node, while data traffic is received by the receiving module 910 from the local gateway via said one aggregation node and is transmitted by the transmitting module 920 to the local gateway via said one aggregation node.

The above modules may be configured to implement corresponding operations or steps as described with reference to FIG. 6 and thus will not be detailed herein for the conciseness purpose.

Figure 10:
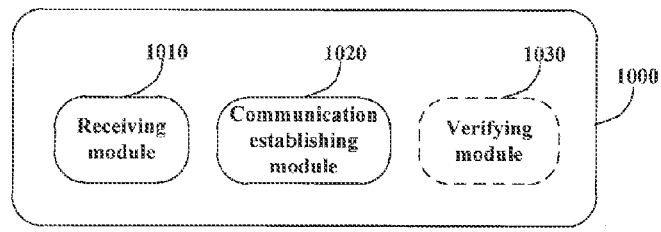
FIG. 10 illustrates a schematic block diagram of an apparatus 1000 at an access node for handover of a terminal device according to an embodiment of the present disclosure.

FIG. 10 illustrates a schematic block diagram of an apparatus 1000 at an access node for handover of a terminal device according to an embodiment of the present disclosure. The access node may be a target node to which the terminal device will be handed over. The apparatus 1000 comprises a receiving module 1010 configured to receive terminal-related context information of the terminal device from the terminal device and to receive network-related context information of the terminal device from a network management center. The apparatus 1000 also comprises a communication establishing module 1020 configured to establish communications with the terminal device based at least on the terminal-related context information and the network-related context information. As described above, the network-related context information of the terminal device may at least comprise information regarding quality of service. The terminal-related context information of the terminal device may at least comprise information related to capabilities of the terminal device and a data transfer status.

In one embodiment, the apparatus 1000 may further comprise a verifying module 1030 configured to verify an identity of the terminal device and integrity of the terminal-related context information based on both verification information provided by the terminal device and security information provided by the network management center. For example, the verification information may be a signature or a cryptographic checksum of a message sent from the terminal device to the target access node that may comprise the terminal-related context information and identification of the terminal device and the security information may be a public key of the terminal device or an integrity session key as described above. Particular methods for verifying the identity of the terminal device and integrity of the context information provided by the terminal device have been described above with reference to FIG. 4 and thus will not be detailed herein for the purpose of conciseness.

The above modules may be configured to implement corresponding operations or steps as described with reference to FIG. 7 and thus will not be detailed herein for the conciseness purpose.

Although the operations of methods 500, 600 and 700 are illustrated in FIGS. 5-7 in a specific order, a person skilled in the art shall understand that some operations may be performed in a reverse order or in parallel. For example, the operations in blocks 710 and 720 of FIG. 7 may be performed concurrently or in a reverse order. Therefore, the order as specified in the figures is merely illustrative instead of limiting.

Figure 11:
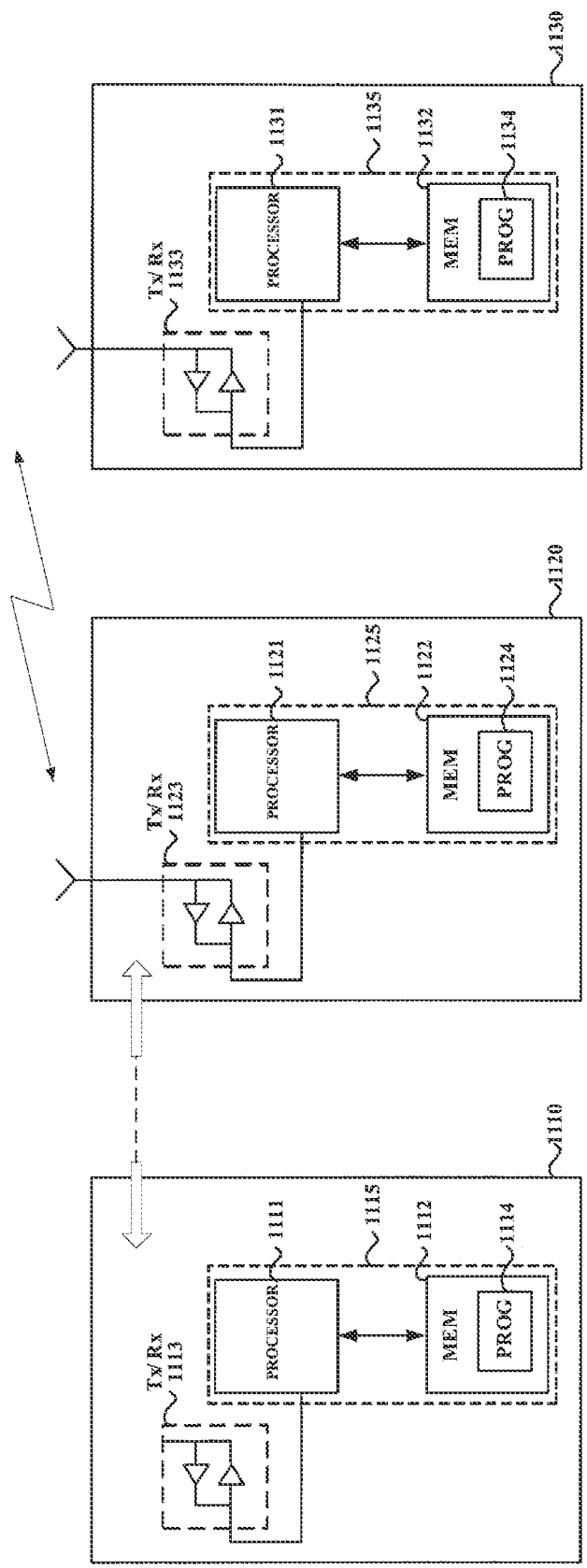
FIG. 11 illustrates a simplified block diagram of an apparatus 1110 that may be embodied as or comprised in a network management center, an apparatus 1120 that may be embodied as or comprised in an access node and an apparatus 1130 that may be embodied as or comprised in a user equipment or terminal device as described with reference to FIGS. 2-7.

FIG. 11 illustrates a simplified block diagram of an apparatus 1110 that may be embodied as or comprised in a network management center, an apparatus 1120 that may be embodied as or comprised in an access node and an apparatus 1130 that may be embodied as or comprised in a user equipment or terminal device as described above with reference to FIG. 2.

The apparatus 1110 comprises at least one processor 1111, such as a data processor (DP) and at least one memory (MEM) 1112 coupled to the processor 1111. The apparatus 1110 may further comprise a transmitter TX and receiver RX 1113 coupled to the processor 1111, which may be operable to connect with an aggregation node via a wired connection and further communicatively connect to the apparatus 1120. The MEM 1112 stores a program (PROG) 1114. The PROG 1114 may include instructions that, when executed on the associated processor 1111, enable the apparatus 1110 to operate in accordance with the embodiments of the present disclosure, for example to perform the method 500. A combination of the at least one processor 1111 and the at least one MEM 1112 may form processing means 1115 adapted to implement various embodiments of the present disclosure.

The apparatus 1120 comprises at least one processor 1121, such as a DP, and at least one MEM 1122 coupled to the processor 1121. The apparatus 1120 may further comprise a suitable TX/RX 1123 coupled to the processor 1121, which may comprise a RF TX/RX operable for wireless communication with the apparatus 1130, and also comprise a wired transceiver for wired communication with the apparatus 1110. The MEM 1122 stores a PROG 1124. The PROG 1124 may include instructions that, when executed on the associated processor 1121, enable the apparatus 1120 to operate in accordance with the embodiments of the present disclosure, for example to perform the method 700. A combination of the at least one processor 1121 and the at least one MEM 1122 may form processing means 1125 adapted to implement various embodiments of the present disclosure.

The apparatus 1130 comprises at least one processor 1131, such as a DP, and at least one MEM 1132 coupled to the processor 1131. The apparatus 1130 may further comprise a suitable TX/RX 1133 coupled to the processor 1131, which may comprise a RF TX/RX operable for wireless communication with the apparatus 1120. The MEM 1132 stores a PROG 1134. The PROG 1134 may include instructions that, when executed on the associated processor 1131, enable the apparatus 1130 to operate in accordance with the embodiments of the present disclosure, for example to perform the method 600. A combination of the at least one processor 1131 and the at least one MEM 1132 may form processing means 1135 adapted to implement various embodiments of the present disclosure.

Various embodiments of the present disclosure may be implemented by computer program executable by one or more of the processors 1111, 1121 and 1131, software, firmware, hardware or in a combination thereof.

The MEMs 1112, 1122 and 1132 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1111, 1121 and 1131 may be of any type suitable to the local technical environment, and may include one or more of general purpose computers, special purpose computers, microprocessors, digital signal processors DSPs and processors based on multicore processor architecture, as non-limiting examples.

Although the above description is made in the context of mmW networks, it should not be construed as limiting the spirit and scope of the present disclosure. The principle and concept of the present disclosure may be more generally applicable to other radio networks.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for mobility management at a network management center, comprising:
receiving a measurement report from a terminal device via a source access node;
determining whether the terminal device needs to be handed over to a target access node based on the measurement report, wherein the source access node and the target access node are communicatively connected to the network management center via their wireless connections with at least one aggregation node that is connected to the network management center via a wired connection;
indicating a target access node to the terminal device being served by the source access node, in response to determining that the terminal device needs to be handed over to the target access node; and
transmitting network-related context information of the terminal device to the target access node that receives terminal-related context information of the terminal device from the terminal device.

2. The method according to claim 1, wherein
the network management center comprises a network controller and a local gateway, to both of which the at least one aggregation node is connected,
said indicating a target access node, said transmitting network-related context information, said receiving a measurement report and said determining whether the terminal device needs to be handed over to the target access node are carried out at the network controller; and
data traffic between the terminal device and the network management center is communicated through the local gateway via one of the at least aggregation node.

3. The method according to claim 1, further comprising:
verifying an identity of the terminal device and integrity of the terminal-related context information based on both verification information provided by the terminal device and security information provided by the network management center; and
informing a result of the verification to the target access node.

4. The method according to claim 1, wherein said network-related context information of the terminal device at least comprises information regarding quality of service.

5. The method according to claim 1, wherein said terminal-related context information of the terminal device at least comprises information related to capabilities of the terminal device and a data transfer status.

6. An apparatus for mobility management at a network management center, comprising:
a first receiver to receive a measurement report from a terminal device via a source access node;
a non-transitory computer-readable storage medium to store instructions;
a set of one or more processors coupled to the non-transitory computer-readable storage medium, operative to execute the instructions which cause the apparatus to:
determine whether the terminal device needs to be handed over to a target access node based on the measurement report, wherein the source access node and the target access node are communicatively connected to the network management center via their wireless connections with at least one aggregation node that is connected to the network management center via a wired connection, and
indicate the target access node to a terminal device being served by the source access node, in response to being determined that the terminal device needs to be handed over to the target access node; and
a first transmitter to transmit network-related context information of the terminal device to the target access node that receives terminal-related context information of the terminal device from the terminal device.

7. The apparatus according to claim 6, wherein
the network management center comprises a network controller and a local gateway, to both of which the at least one aggregation node is connected;
the set of one or more processors and the non-transitory computer-readable storage medium are comprised in the network controller; and
wherein the local gateway comprises a second transmitter to transmit data traffic to the terminal device and a second receiver to receive the data traffic from the terminal device via one of the at least one aggregation node.

8. The apparatus according to claim 6, wherein the apparatus is further to:
verify an identity of the terminal device and integrity of the terminal-related context information based on both verification information provided by the terminal device and security information provided by the network management center; and
inform a result of the verification to the target access node.

9. The apparatus according to claim 6, wherein said network-related context information of the terminal device at least comprises information regarding quality of service.

10. The apparatus according to claim 6, wherein said terminal-related context information of the terminal device at least comprises information related to capabilities of the terminal device and a data transfer status.

11. An apparatus for mobility management at a network management center, comprising a processor and a memory, said memory containing instructions executable by said processor whereby said apparatus is operative to perform operations comprising:
receiving a measurement report from a terminal device via a source access node;
determining whether the terminal device needs to be handed over to a target access node based on the measurement report, wherein the source access node and the target access node are communicatively connected to the network management center via their wireless connections with at least one aggregation node that is connected to the network management center via a wired connection;
indicating the target access node to the terminal device being served by a source access node, in response to determining that the terminal device needs to be handed over to the target access node; and
transmitting network-related context information of the terminal device to the target access node that receives terminal-related context information of the terminal device from the terminal device.

* * * * *

UNITED STATES PATENT AND TRADEMARK OFFICE
CERTIFICATE OF CORRECTION

PATENT NO. : 9,655,010 B2  
APPLICATION NO. : 14/417115  
DATED : May 16, 2017  
INVENTOR(S) : Fan et al.

Page 1 of 1

It is certified that error appears in the above-identified patent and that said Letters Patent is hereby corrected as shown below:

On the Title Page

Below item (86), insert item -- (87) PCT Pub. No.: WO/2016/095139 PCT Pub. Date.: Mar. 23, 2016 --.

In the Specification

In Column 7, Line 11, delete "Public" and insert -- Packet --, therefor.

In Column 16, Line 11, delete "Blue-ray disc" and insert -- Blu-ray disc --, therefor.

In the Claims

In Column 17, Line 27, in Claim 2, delete "connected," and insert -- connected; --, therefor.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*